Jan. 2, 1951 R. M. SOMERS 2,536,666

REEL-TYPE PHONOGRAPHIC MACHINE

Filed Jan. 4, 1947 2 Sheets-Sheet 1

INVENTOR
Richard M. Somers
BY Harry Lanahan
ATTORNEY

REEL-TYPE PHONOGRAPHIC MACHINE

Filed Jan. 4, 1947

INVENTOR
Richard M Somers
BY Henry Lanahan
ATTORNEY

Patented Jan. 2, 1951 2,536,666

UNITED STATES PATENT OFFICE 2,536,666

REEL-TYPE PHONOGRAPHIC MACHINE

Richard M. Somers, West Orange, N. J., assignor to Thomas A. Edison, Incorporated, West Orange, N. J., a corporation of New Jersey Application January 4, 1947, Serial No. 720,197

5 Claims. (Cl. 179—100.1)

This invention relates to improvements in phonographic machines which use a record of wire or tape form wound onto and from reels and, more particularly, the invention is concerned with such machines of the combined recording and reproducing type.

Typically, the invention relates to magnetic-type phonographic machines known as telegraphones, but no unnecessary limitation of the invention to this type of machine is intended.

An object of the present invention is to provide improvements in reel-type phonographic machines which will enhance their value as dictating machines. It is to be noted that a practical requirement of a dictating machine is that it be arranged so as to enable the user to "listen back" conveniently to selected portions of prior recorded matter without undue waste of time. A defect of standard reel-type phonographic machines, in this respect, is that a relatively long time is required to backspace to a first part of the record if one has already proceeded a considerable distance along the record, and again another considerable time is required, after reproducing a selected portion, to return to the last prior recording position of farthest advance. By my invention these defects are largely overcome by providing a driving system for the record which is selectively controllable not only to advance the record at normal speed but also to backspace the record at a fast speed—a substantially higher speed than normal—as well as to advance the record at such fast speed when it is desired to return quickly, following the backspacing operation, to the last prior position of farthest advance.

It is a further object to provide novel control means for such reel-type phonographic machines, which are arranged to enable easy selection of the several functions of the machine.

It is another object to provide novel and improved means for automatically restoring the speed of the record to normal and conditioning the machine for recording upon the return of the record to its last prior position of farthest advance following a backspacing operation.

Another object is to provide a novel control system for the aforestated automatic restoring means.

These and other objects and features of my invention will be apparent from the following description and the appended claims.

Figure 1:
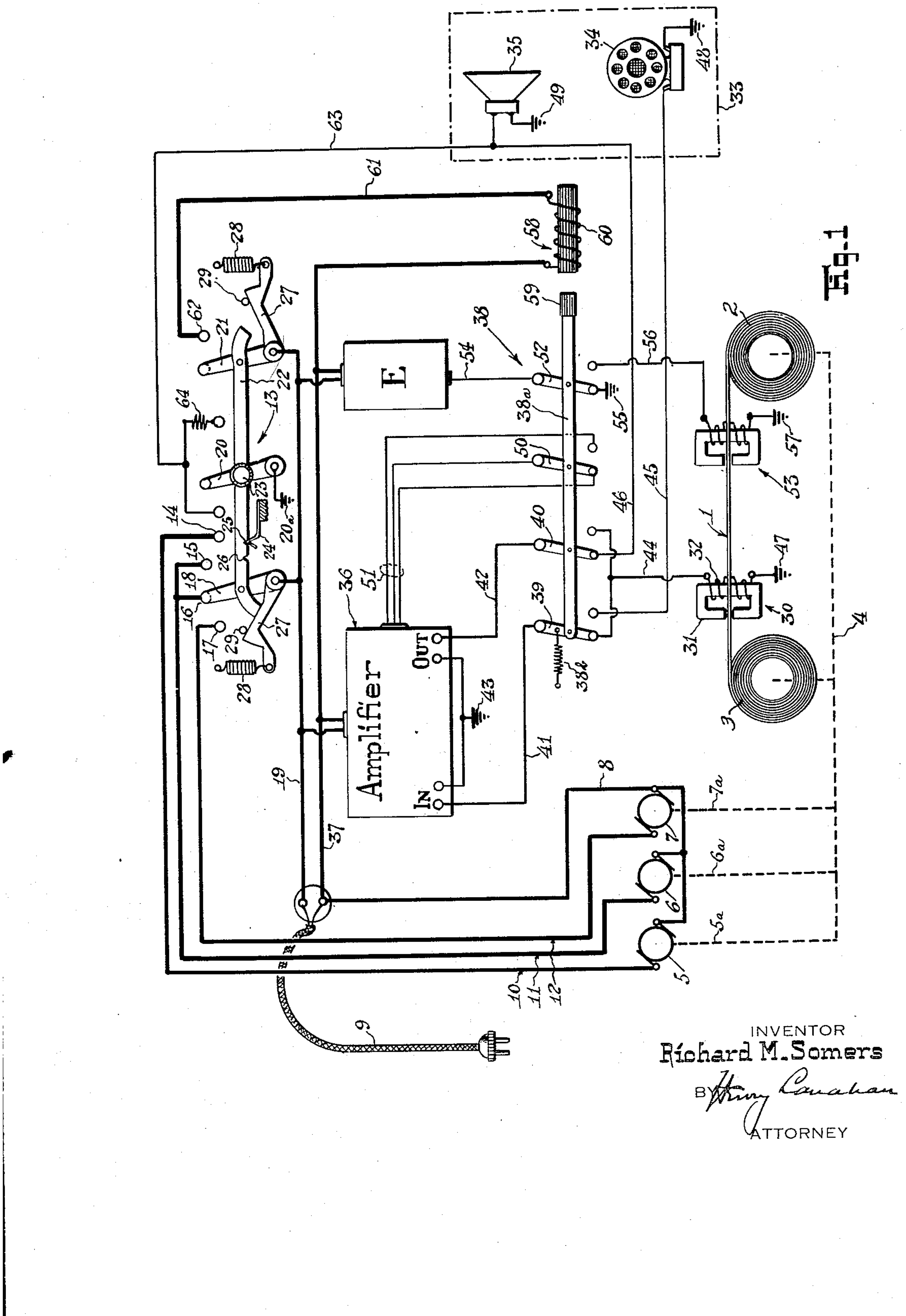
Figure 2:
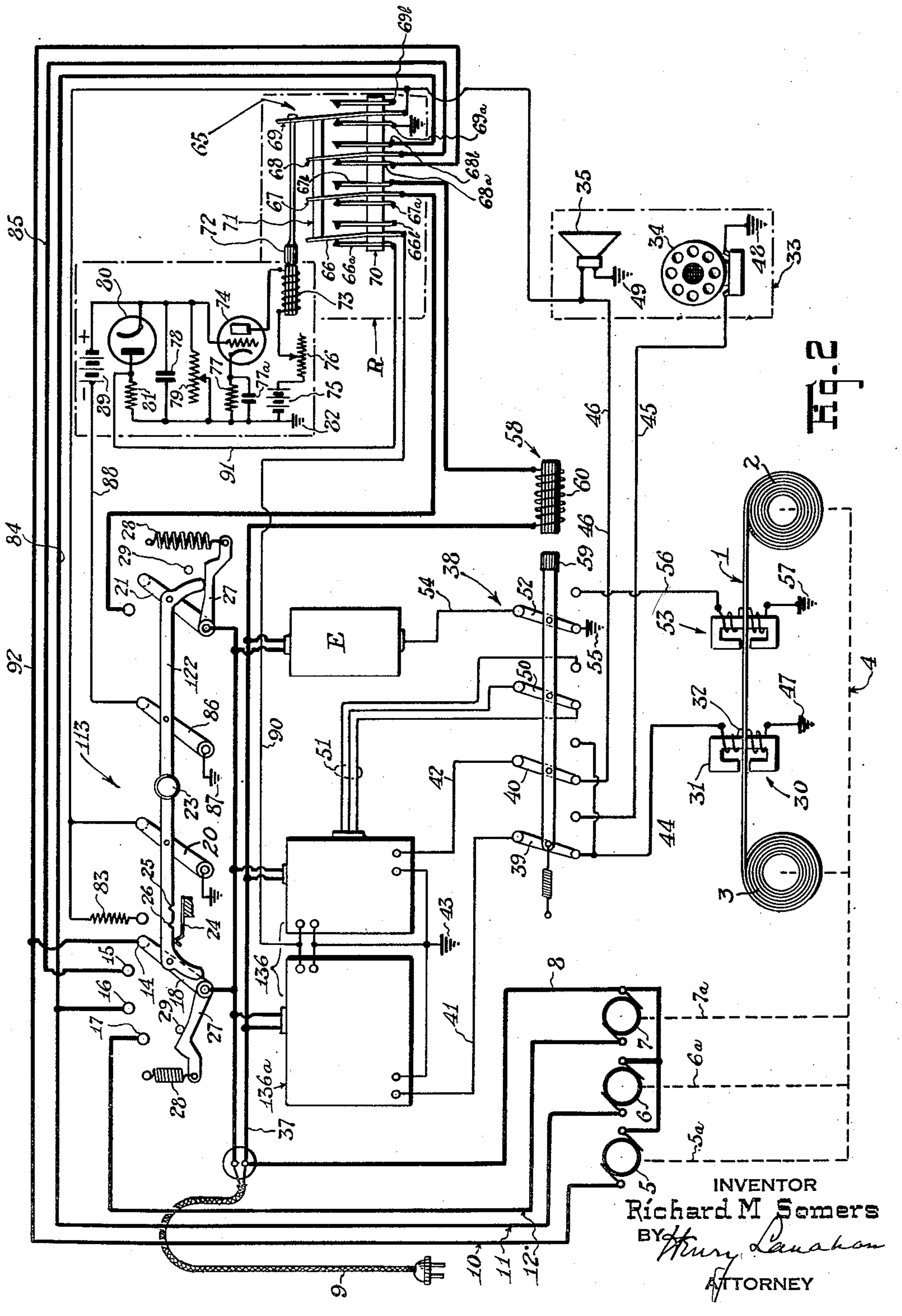

In the description of my invention reference is had to the accompanying drawings, of which:

Figure 1 is a diagrammatic view of circuits and mechanism of a magnetic recording and reproducing machine incorporating one embodiment of my invention; and Figure 2 is a similar view illustrating a second embodiment of my invention wherein are incorporated automatic means for restoring the machine to normal recording position, following a backspacing operation, upon the return of the record to its last prior position of farthest advance.

In Figure 1 a phonographic machine is shown as comprising a record 1 of wire or tape form, typically of magnetizable material, which is drawn from a supply roll 2 and wound onto a take-up reel 3 in the way commonly employed in such machines. The particular coupling mechanism by which the reels are so driven is herein diagrammatically indicated as 4 since it is well known in the art and a detailed description thereof is unnecessary for the purposes of the present invention. In the present invention, however, the record is driven at different speeds and in both forward and backward, or reverse, directions. For simplification of the description this is shown as being accomplished by three separate motors 5, 6 and 7 having respective drive connections 5*a*, 6*a* and 7*a* to the mechanism 4 abovementioned. The motor 5 is adapted to drive the record forwardly at a fast speed, say ten times normal speed; the motor 6 is adapted to drive the record forwardly at normal speed; and the motor 7 is adapted to drive the record in a backward or reverse direction also at a fast speed of say ten times normal speed. These motors have one common power supply lead 8 from a power cable 9 which is adapted for plug-in connection to a power source, and have respective other leads 10, 11 and 12 which lead to one section of a manually operable three-pole four-position master switch 13. This one section comprises a terminal 14 connected to the lead 10, terminals 15 and 16 both connected to lead 11 and terminal 17 connected to lead 12. Associated with these terminals is a pole 18 connected by a lead 19 to the other side of the power cable 9.

When the master switch 13 is in a "backspacing" or "first terminal" position corresponding to the lefthand position of the pole 18, the latter contacts the terminal 17 to energize the motor 7 and cause the record to be driven backward at fast speed. When the master switch is moved rightwardly into successive positions referred to as its "reproduce" and "record" positions respectively, the pole 18 contacts the terminals 16 and 15 to energize the motor 6 and cause the record to be driven forwardly at normal speed. When the master switch is moved further rightwardly into a "restoring" or "second terminal" position, the pole 18 contacts the terminal 14 to energize the motor 5 and cause the record to be driven in a forward direction at fast speed.

The master switch 13 has two other pole members 20 and 21, hereinafter described, which are mechanically coupled to the pole 18 by an insulating tie bar 22. On this tie bar there is a knob 23 for manually operating the switch. Also associated with the tie bar is a detent spring 24 which engages respective notches 25 and 26 in the bar when the master switch is in reproduce and record positions respectively, so as to detent the switch in these positions. However, when the master switch is moved into either of its terminal positions, the tire bar is moved against a pivoted arm 27 biased by a spring 28 against a stop pin 29. Thus, the master switch is biased out of its terminal positions and will return to reproduce and record positions respectively when the switch is manually released from its first and second terminal positions.

Associated with the record 1 is an electromagnetic translating means for recording on and reproducing from the record. This translating means may, for example, be a unitary translating device 30 adapted to serve either as a recorder or as a reproducer. This device comprises a magnetic core 31 having confronting poles at opposite sides of the record and having a coil 32. This coil is connected in an audio system which is selectively conditionable for recording and reproducing. This audio system comprises a transducer 33 usable either as a microphone or sound receiver but comprising preferably separate microphone and receiver units 34 and 35, an electrical amplifier 36 energized from the power cable 9 by way of the lead 19 and a lead 37, and a two-position four-pole selector switch 38 the poles of which are mechanically coupled together by an insulating tie bar 38*a*. Two poles 39 and 40 of this switch are connected by leads 41 and 42 to one side of the input and output respectively of the amplifier 36, the other side of the amplifier input and output being grounded at 43. Associated with the pole 39 is a leftward terminal connected by a lead 44 to one side of the coil 32 and a rightward terminal connected by a lead 45 to the microphone 34. Associated with the pole 40 is a left terminal connected by a lead 46 to the receiver 35 and a right terminal connected also by the lead 44 to the coil 32. The coil 32, microphone 34 and receiver 35, like the amplifier 36, each have one side grounded as at 47, 48 and 49 respectively. When the selector switch is in reproduce position, as shown, the pole 39 connects the translating device, acting as a reproducer, to the input of the amplifier and the pole 40 connects the output of the amplifier to the receiver 35 to condition the audio system for reproducing. Conversely, when the selector switch is thrown to its record position the pole 39 connects the microphone 34 to the amplifier input, and the pole 40 connects the output of the amplifier to the translating device, acting now as a recorder, to condition the audio system for recording.

A third pole 50 of the selector switch 38 and two associated terminals are connected by three leads, generally referred to as 51, to the amplifier 36. This section of the selector switch 38 is intended for modifying the amplifier circuit. It may for example be adapted for changing the gain of the amplifier as the audio system is conditioned for recording and reproducing or, alternatively, for cutting in an automatic volume control during recording and disabling it during reproducing as taught by Dunning Patent No. 2,163,671.

A fourth pole 52 of the switch 38 controls a system for erasing signals from the magnetic record 1. This system comprises a translating device 53, which may be the same as the device 30 above described, and an eraser E comprising a high-frequency oscillator energized by way of the leads 19 and 37. The eraser E has an output lead 54 connected to the pole 52. Associated with this pole 52 is a left terminal grounded at 53 and a right terminal connected by a lead 56 to one side of the coil of the translating device 53, the other side of this coil being grounded at 57.

The switch 38 is spring-urged leftwardly into reproduce position as by a tension spring 38*b*. Actuation of the switch into record position is effected by an electromagnet 58 comprising an armature 59 connected to the tie bar 38*a*. This electromagnet has a coil 60 one side of which is connected to the power lead 37 and the other side of which is connected by a lead 61 to a terminal 62 which is engaged by the pole 21 of the master switch 13 when this switch is in record position, all other terminals associated with this pole 21 being idle. The pole 21 is connected to the power lead 19. Thus, when the master switch 13 is in record position, the electromagnet 58 is energized to throw the selector switch 38 into record position. In all other positions of the master switch the selector switch is held in reproduce position by the spring 38*b*.

The second pole 20 of the master switch is grounded at 20*a*. When the master switch is in its first terminal position this pole is connected by a lead 63 to the receiver 35 to short the receiver and thus disable the audio system. When the master switch 13 is in its second terminal position the pole 20 is connected through a resistor 64 to the receiver. This resistor is chosen so as to attenuate the sound output of the receiver to a low level of audibility.

To condition the phonographic machine to record the user has has only to place the master switch 13 into record position. This will put the motor 6 into operation to produce a forward movement of the record 1 at normal speed and will operate the electromagnet 58 to throw the selector switch 38 into record position, the effect of the latter being to connect the microphone 34 through the amplifier to the translating device 30 and to put the eraser system into operation. When the user desires to listen back on some portion of his recorded dictation, he will first move the master switch 13 into its backspacing or first terminal position so as to backspace the record at a fast speed. As the record is so backspaced the electromagnet 58 is deenergized and the selector switch 38 is in reproduce position to connect the translating device 30 through the amplifier to the receiver 35. However, the speaker may be now shorted, as abovementioned, by the ground circuit 63 through the pole 20 so that no gibberish sounds are produced during the backspacing. (Alternatively, the speaker may be only partly shorted so that it will emit sounds at a low level of audibility as hereinafter described in my second embodiment.) When the user believes the record is backspaced sufficiently he will release the master switch so that it will return automatically to reproduce position under the influence of one of the springs 28. As this is done, the motor 6 is again energized to produce normal forward movement of the record. Since the audio system is still in reproduce condition, but with the short now removed from the receiver 35, the selected recorded matter will be next reproduced. If the user has reproduced the selected recorded matter but has not returned to his last prior position of farthest advance, he will move the master switch 13 ahead into the restoring or second terminal position and will hold it there until a full return to the last prior position of farthest advance is reached. This return will occur quickly because the motor 5 is now energized to drive the record ahead at a fast speed. During the return to this farthest-advance position the audio system is in effective reproducing position so that the receiver 35 will emit gibberish sounds to enable the user to detect, by the cessation of those sounds, when that prior farthest-advance position is reached.

The embodiment shown in Figure 2 is not claimed herein since the same is the subject of a divisional application Serial No. 119,165, filed October 1, 1949 and entitled "Control System for Phonographs of the Combined Recording-Reproducing Type." This embodiment comprises in the main the same components as are employed in the embodiment above described. When analogous components are identical and serve the same function in this second embodiment they are given the same reference characters as in the first embodiment. Other components slightly altered are given the reference character of the analogous component of the first embodiment increased by 100, and new components are given new reference characters. In this second embodiment there is provided a means for automatically restoring the phonograph to recording condition when, after a backspacing operation, the record is returned to a prior recording position of farthest advance. This automatic means is put into operation by manually placing the master switch momentarily into its second terminal position, and is thence automatically controlled by signals picked up from the record by the translating device 30 acting as a reproducer.

This automatic restoring means comprises a relay R which has a two-position switch 65 provided with four poles 66, 67, 68 and 69 insulatedly mounted in a stack 70 and mechanically connected to each other by an insulating tie bar 71. Also in the stack 70 there are left and right contacts for each pole, referred to by the number of the respective pole with the suffix letters *a* and *b*. The poles are connected to an armature 72 which is actuated electromagnetically by a coil 73. This coil is connected in the plate circuit of a vacuum tube 74 which may suitably be a triode as shown. The plate circuit is energized, for example, by a battery 75 through an adjustable resistor 76 which is adjustable to set the sensitivity of the relay. The tube 74 is self-biased by a resistor 77 in its cathode circuit typically shunted by a condenser 77*a*. Connected to the grid of this tube is a time-delay circuit comprising a condenser 78 and a resistor 79 of which the latter is adjustable to set the timing to a desired value. In parallel with this time-delay circuit is a rectifier 80 and a resistor 81 connected in series. The grid, cathode and plate circuits have a common ground at 82.

The tube 74 is biased by the resistor 77 to such an extent that the plate current is normally insufficient to hold the relay R operated; accordingly, the switch 65 is normally in an unoperated or rightward position wherein the poles thereof make with the respective contacts having the suffix letter *b*. However, upon impressing a positive potential of suitable value on the grid of the tube, the plate current is increased and the relay is operated to cause the poles to make with the leftward contacts having the suffix letter *a* which is the position of the switch 65 shown in Figure 2. When the relay is not operated, the system is set to function in the first terminal, record and reproduce positions of the master switch, here referred to as 113, the same as in the first embodiment abovedescribed except that a resistor 83 is now connected across the receiver 35, which is insufficient to effectively short the receiver, so that the user may judge from the reproduced gibberish sounds when he has backspaced to selected portions of his recorded dictation. It is to be noted, however, that in the record position of the master switch the power circuit for the motor 6 is completed from the lead 11 to the terminal 15 by way of a lead 84, the contact 68*b* and pole 68 and a lead 85; and the power circuit for the electromagnet 58 is completed through the contact 67*b* and pole 67. (Contacts 66*b* and 69*b* are idle and therefore the associated poles 66 and 69 do not now influence the system.)

When the master switch is thrown to its second terminal position a positive potential is placed on the grid of the tube 74 to operate the relay R and to initiate the automatic restoring means hereinafter described. For this purpose the master switch has an additional pole 86 which is connected to ground at 87. In the second terminal position of this master switch, this pole 86 connects with a trigger circuit 88 which leads to the grid of the tube 74 and which serially includes a battery 89 to provide the positive potential on the grid noted above. This potential is applied to the grid approximately at the instant the circuit 88 is closed, with the result that the automatic restoring means is immediately put into operation. Having so initiated the automatic restoring means, the user may remove his hand from the master switch, letting the switch return to record position under the influence of the spring 28, and awaits the automatic restoration of the machine to record condition as is herein next explained.

When the relay R is in operated condition, the power circuit of the relay 58 is broken by the switch elements 67 and 67*b* and the audio system is accordingly left in reproduce condition. At the same time the resistor 81 is connected to the output of a voltage section 136*a* of the amplifier 136—corresponding to the amplifier 36 of the first embodiment—this connection being by way of a lead 90, the pole 66 and contact 66*a* of switch 65, and a lead 91. Signals which are picked up by the translating device 30, acting as a reproducer, from the previously recorded portion of the record 1 are now amplified by the amplifier 136*a* and fed to the resistor 81. The signal voltage which is so developed across the resistor 81 is rectified by the rectifier 80, and fed across the time-delay circuit 78—79 to the grid of the tube 74. The rectifier is polarized so that this voltage will appear at the grid as a positive potential. So long as this potential is substantially uninterrupted, it serves to hold the relay R operated after the battery 89 is removed. The time delay of the circuit 78—79—which may typically be from one-half to one second—is effective on discharge of the condenser 78. This time delay is to prevent immediate release of the relay R when the signal voltage on the resistor 81 is removed so that short blank (unrecorded) spaces on the record 1 will not cause the machine to be restored to record condition. Thus, a condition of normal recordation (recordation without substantial interruptions) of the portion of the record 1 which is traversed by the translating device as the record is returned, following the backspacing thereof, to the prior recorded position of farthest advance, is utilized to maintain the relay R in its operated state.

When the master switch is first thrown into its second terminal position the motor 5 is energized by a circuit comprising the lead 10, terminal 14 and pole 18 to cause the record to be driven forwardly at fast speed. When the master switch is released to record position following the operation of relay R, the motor 5 is still energized, but now by a circuit comprising the lead 10, a lead 92, contact 68*a*, pole 68, lead 85 and pole 18, so as to maintain a fast forward speed of the record. Since the record is driven forwardly at fast speed during the time the translating device 30 is advanced to its prior position of farthest advance, substantial interruptions in the recordation of the record, particularly in view of the time delay of the circuit 78—79, are ineffective to cause the relay R to be released. When, however, the record has returned to its prior recording position of farthest advance, the signals picked up by the translating device 30 will cease, the holding current in the plate circuit of the tube 74 will return to its normal low level and the relay 65 will return to unoperated position in response to the natural biasing of the poles 66—69. When this occurs, the motor 5 is shut off by the opening of contacts 68—68*a* and the motor 6 is again energized by way of the circuits hereinbefore described to cause the record to be now driven forwardly at normal speed, and the electromagnet 58 is again energized to put the audio system into recording condition.

From the foregoing description of this second embodiment it will be understood that when the user has backspaced to listen to a selected portion of his recorded dictation, but has not reproduced all of the dictated matter traversed by the translating device 30 in the backspacing operation, he can after completing the reproducing operation restore the machine quickly to condition for recording simply by momentarily holding the master switch in its second terminal position, for in so doing he starts the return to the prior position of farthest advance at a fast speed and causes the record speed to be reduced to normal and the audio system to be conditioned for recording when that prior farthest-advance position is reached.

While I have hereinabove described my invention in terms of certain preferred embodiments, it will be understood that these embodiments are subject to changes and modifications without departure from the scope of my invention which I endeavor to express according to the following claims.

I claim:

1. In a phonograph system including a movable supporting means for a phonograph record, the combination of a record-cooperable translating means; a selectively-controllable drive system coupled to said record-supporting means and adapted for advancing said record at either normal or fast speeds or for backspacing the record at a fast speed; and an audio system including said translating means and selectively placeable into inoperative condition or into operative conditions for recording on or reproducing from said record; a manually-operable unitary control device having "first terminal," "reproduce," "record" and "second terminal" positions in the order here named; means connecting said control device to said drive system to cause the latter to effect fast backspacing of the record when the control device is in said first terminal position, to effect normal advance of the record when the control device is in said reproduce and record positions, and to effect fast advance of the record when the control device is in said second terminal position; means controlled by said control device for conditioning said audio system for reproducing and recording respectively as the control device is moved into said reproduce and record positions; means for detenting said control device in said reproduce and record positions respectively; and yieldable means in the paths of movement of said control device into its respective terminal positions adapted to return the control device to said reproduce and record positions on manual release of the control device from said first terminal and second terminal positions respectively.

2. The combination set forth in claim 1 including means controlled by said control device to condition said audio system for reproducing when said control device is in said second terminal position.

3. The combination set forth in claim 2, including means controlled by said control device to reduce the output level of said audio system when the control device is in said second terminal position.

4. In a phonograph system including movable supporting means for a phonograph record: the combination of a record-cooperable translating means operable selectively as a recorder or as a reproducer; a transducer operable selectively as a microphone or as a receiver; a reversible drive system coupled to said record-supporting means and including three drive-control circuits respectively closable to cause said record to be backspaced at a fast speed, to be advanced at normal speed and to be advanced at a fast speed; an audio circuit including an electric amplifier and said translating means and transducer; a first switch device placeable into first, second and third conditions for closing said drive control circuits in the order named; a second switch device placeable into first and second conditions; means controlled by said second switch device as the same is placed into said first and second conditions for interconnecting said translating means and transducer by way of said amplifier to condition said audio system respectively for recording on and reproducing from said record; manually-operable control means connected to said switch devices and movable into a first terminal position to place said first and second switch devices in their said first and second conditions respectively, into a first intermediate position to place both of said switch devices in their said second conditions, into a second intermediate position to place said first and second switch devices in their said second and first conditions respectively, and into a second terminal position to place said first and second switch devices in their said third and second conditions respectively; means for detenting said control means in its two intermediate positions respectively; and means controlled by said control means as the same is moved into a terminal position for returning the control means to the respectively adjacent intermediate position when the control means is manually released.

5. The combination set forth in claim 4 including a third switch device operable into first, second and third conditions; means controlled by said third switch device to disable said audio system as said third switch device is placed into said first condition, to able said audio system as said third switch device is placed in said second condition, and to able said audio system for operation at a reduced output level as said third switch device is placed into said third condition; and means connecting said control means to said third switch device for causing the latter to be in its said first condition when the control means is in one of its terminal positions, in said second condition when the control means is in its intermediate positions, and in said third condition when the control means is in its other terminal position.

RICHARD M. SOMERS.

REFERENCES CITED

The following references are of record in the file of this patent:

UNITED STATES PATENTS

| Number | Name | Date |
|---|---|---|
| 789,336 | Poulsen et al. | May 9, 1905 |
| 2,091,756 | Fodor | Aug. 31, 1937 |
| 2,196,738 | Nagel | Apr. 9, 1940 |
| 2,314,834 | Kiel | Mar. 23, 1943 |
| 2,351,005 | Camras | June 13, 1944 |
| 2,401,889 | Smith | June 11, 1946 |
| 2,419,476 | Begun | Apr. 22, 1947 |

FOREIGN PATENTS

| Number | Country | Date |
|---|---|---|
| 45,472 | Netherlands | Mar. 16, 1939 |